Patented Dec. 6, 1949

2,490,386

UNITED STATES PATENT OFFICE 2,490,386

PRODUCTION OF UNSATURATED ACID HALIDES

Roy W. Tess, Berkeley, George W. Hearne, El Cerrito, and Harry L. Yale, Berkeley, Calif., assignors to Shell Development Company, San Francisco, Calif., a corporation of Delaware No Drawing. Application June 15, 1946, Serial No. 677,090

7 Claims. (Cl. 260—544)

This invention relates to a novel method of preparing acrylyl type acid halides.

More specifically, the invention is directed to an economical and efficient method of preparing acrylyl halides, methacrylyl halides, and crotonyl halides, the bromides and chlorides in particular, and related unsaturated acid chlorides and bromides having an olefinic carbon atom directly linked to the carbonyl group. Specifically, the invention pertains to a process whereby the aforementioned acrylyl type acid halides are prepared from the respective acrylyl type aldehydes by direct reaction of the aldehyde with a halogen, whereby the hydrogen of the formyl group is substituted by a halogen atom to form the corresponding acid halide without any substantial side reaction leading to halogenation elsewhere in the molecule.

The process of the present invention is predicated upon the unexpected discovery that the hydrogen in the formyl group of unsaturated aldehydes having an olefinic carbon atom directly linked to the carbonyl group may be preferentially substituted by halogen by direct interaction of the aldehyde with a halogen, without substantial side reaction leading to halogenation elsewhere in the aldehyde molecule. It is known to halogenate olefinic hydrocarbons such as propylene and homologous compounds by substitutive interaction between the hydrocarbon and a halogen under appropriate conditions. Because of the known reactivity of unsaturated hydrocarbons toward molecular halogens, it is an unexpected result to find that the non-hydrocarbon hydrogen of the formyl group in the herein defined class of unsaturated olefinic aldehydes may be preferentially substituted by a halogen atom to form the acid halide corresponding to the unsaturated aldehyde. On the basis of the present discovery, the process of the present invention provides an improved, economical, and efficient method for the preparation of unsaturated acid halides having an olefinic carbon atom directly linked to the carbonyl group from readily available raw materials and in a manner highly adaptable to the requirements of industrial practice.

The unsaturated halides having an olefinic carbon atom directly linked to carbonyl group and which may be employed in accordance with the process of the present invention are those unsaturated halides having the general structural formula:

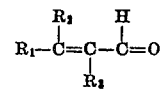

wherein $R_1$, $R_2$, and $R_3$ each represent a radical selected from the group consisting of hydrogen, halogen, alkyl, cycloalkyl, aryl, and aralkyl radicals. $R_1$ and $R_3$ may represent portions of a cyclized alkyl group and thus may be portions of a non-aromatic ring if desired. As examples of the unsaturated halides having an olefinic carbon atom directly linked to the carbonyl group and which are adaptable to the objects of the present invention, there may be mentioned, for example, the non-aromatic unsaturated halides such as acrolein, methacrolein, crotonaldehyde, alpha-methyl crotonaldehyde, alpha-ethyl crotonaldehyde, alpha-isopropylcrotonaldehyde, isobutylacrolein, alpha, beta - dimethylcrotonaldehyde, alpha,beta-diethylcrotonaldehyde, and similar and homologous halides wherein $R_1$, $R_2$, and $R_3$ are either hydrogen or aliphatic radicals such as methyl, ethyl, propyl, isopropyl, butyl, isobutyl, and homologous radicals. Representative unsaturated aldehydes that advantageously may be employed in accordance with the process of the present invention and in which $R_1$ and $R_3$ are portions of a non-aromatic ring are, for example, 1-formylcyclohexene-1, 1-formyl-4-methylcyclohexene-1, and the like. Instead of the non-aromatic unsaturated halides above referred to, there may be employed aromatic halides wherein at least one of $R_1$ and $R_2$ and $R_3$ represent an aryl or an aralkyl radical such as the phenyl, tolyl, xylyl, benzyl, and similar and homologous aromatic substituent groups. Representative examples of such aldehydes are, for instance, beta-phenyl acrolein, alpha-phenyl acrolein, beta-phenyl crotonaldehyde, beta-tolyl methacrolein, and the like. If desired, the process of the present invention desirably may be employed for the conversion of halogen-substituted unsaturated aldehydes having an olefinic carbon atom directly linked to the carbonyl group to the corresponding halogen substituted unsaturated acid halides, for example, for the conversion of alpha-chlorcrotonaldehyde to alpha-chlorcrotonyl bromide, etc. Although the process for the present invention thus is applicable broadly to the above-defined general class of unsaturated aldehydes having an olefinic carbon atom directly linked to the carbonyl group, it has been found to be of particular value in its application to the conversion of those members of the defined class which contain not more than four carbon atoms to the corresponding acid halides. The process of the present invention therefore is most desirably applied to the conversion of acrolein, methacrolein, or crotonaldehyde, to acrylyl chloride or bromide, methacrylyl chloride or bromide, or crontonyl chloride or bromide, respectively.

In practicing the process of the present invention, the unsaturated aldehyde of the herein defined class is reacted with a halogen selected from the group consisting of chlorine and bromine at a suitably elevated temperature. The particular temperature that is most desirably employed in any given instance depends to a certain extent upon the other conditions under which the reaction is effected, such as time of contact, relative proportions of reactants, design of apparatus, etc., and to a certain extent by the specific unsaturated halide and halogen that are to be reacted. In each case, however, there exists a certain minimum temperature above which it is necessary to maintain the reaction temperature in order to promote substantial substitution of the formyl hydrogen by halogen. Generally speaking, it is necessary to maintain the reaction temperature at a value above about 200° C., although it will be appreciated that in certain cases a slightly higher or slightly lower minimum temperature may be desirable. Generally speaking, it is preferred to use a reaction temperature above about 250° C. The maximum temperature that may be used in accordance with the process of the present invention is determined by the maximum temperature to which the reactants and/or reaction product can be subjected under the conditions existing without excessive degradation, such as polymerization, loss of halogen, carbonization, or other undesirable changes therein. For the purpose of obviating such undesirable degradation, the reaction is effected according to the process of the present invention at a temperature below a temperature favoring substantial degradation. In general, it is desirable to employ a maximum reaction temperature less than about 600° C. and preferably less than about 500° C. In the case of conversion of acrolein to acrylyl chloride by reaction of acrolein with chlorine, or conversion of methacrolein to methacrylyl chloride by reaction of methacrolein with chlorine, for instance, it has been found that optimum results may be obtained through a use of the reaction temperature within the range of about 250° C. to about 400° C.

The reactants may be introduced into the reaction zone either previously mixed or separately. A particularly convenient procedure involves mixing the two reactants in the vapor phase and passing a stream of the mixed vapors through an elongated reaction gas zone maintained by suitable means at a temperature within the desired temperature range. If the reaction temperature is below the boiling point of the unsaturated aldehyde at the pressure employed, the aldehyde may be introduced into the reaction zone in the liquid state. For example, a stream of gaseous chlorine or gaseous bromine may be introduced into a stream of the unsaturated aldehyde and the mixture passed through a reaction tube maintained at a temperature within the range of from about 200° C. to about 600° C., preferably from about 250° C. to about 500° C., by an externally located heating means. Under certain circumstances, it is possible that undesirable side reaction between the unsaturated aldehyde and the halogen, such as possible halogen addition at the olefinic bond, may occur at temperatures below the present reaction temperatures. For the purpose of eliminating or minimizing such possible side reactions, it usually is desirable to preheat the reactants before they are mixed together. Either one or both of the reactants may thus be preheated, provided the desired elimination of possible low-temperature side reactions is obtained. Generally, however, it is desirable to preheat both reactants before they are mixed preferably to within the range of temperatures contemplated for the present process. A particularly advantageous method of operation involves preheating both the unsaturated aldehyde and the halogen, rapidly and continuously introducing a stream of the halogen into a stream of the aldehyde vapor, and immediately thereafter continuously passing the mixed reactants through a reaction zone maintained within the desired temperature range. In certain cases it is possible to eliminate the preheating step as by mixing the reactants in the vapor phase at ordinary temperatures and then rapidly raising the temperature of the mixture by any suitable means to within the present range of reaction temperatures.

The velocity at which the reactants are mixed and passed through the reaction zone depends upon the temperature of reaction employed, the extent of preheating, the relative proportions of the two reactants in the reaction mixture, and other existing conditions. At lower rates of linear flow and at low ratios of unsaturated aldehyde to halogen, there may exist a tendency toward spontaneous combustion or explosion resulting from the exothermic nature of the reaction. Such a tendency generally may be overcome by increasing the rate of flow to a sufficiently high value, and/or increasing the relative proportions of the unsaturated aldehyde in the reaction mixture. High linear velocity through the reaction zone tends to minimize carbon formation therein. A low residence time in the reaction zone tends to minimize possible undesired side reaction such as between the hydrogen halide formed by reaction and the unsaturated aldehyde and/or acid halide. It therefore generally is desirable to employ a velocity of the reaction mixture through the reaction zone that will provide a residence time sufficient to promote halogen substitution of the formyl hydrogen but insufficient to promote excessive undesired side reactions, degradation, and the like.

Any possible tendency toward combustion, or explosion of the reaction mixture also may be overcome, for example, by reducing the volume concentration of the reactants as by including an inert diluent in the reaction mixture, by carrying out the process at subatmospheric pressure, and by equivalent means. When an amount of unsaturated aldehyde greater than that stoichiometrically equivalent to the halogen is employed, the excess unsaturated aldehyde acts as a diluent of the reaction mixture.

The unsaturated aldehyde, having an olefinic carbon atom directly linked to the carbonyl group, and the halogen may be mixed and brought into reactive contact in any desired proportion and with either the halogen or the aldehyde present in molar excess. Generally, however, it is preferred to effect their reaction in the presence of a molar excess of the unsaturated aldehyde, since by so doing there are obtained higher yields based upon the halogen consumed and control of the reaction is facilitated. Preferably, the unsaturated aldehyde and the halogen are mixed and brought into reactive contact in a molar ratio of aldehyde to halogen between about 1:1 and 5:1.

The reaction zone, in the case of continuous operation of the present process, may be defined for example by a suitable reaction tube constructed of an appropriately corrosion resistant alloy, such as stainless steels, nickel alloys such as corrosion-resistant nickel-copper and nickel-molybdenum alloys, and the like, or of other suitable materials such as carbon, quartz, glass, porcleain, etc. The reaction tube, if desired, may be surrounded by a heating means throughout a part or all of its length to provide control and maintenance of the temperature within the desired temperature range. If the design of the reaction chamber is such that insufficient heat is lost therefrom to maintain the temperature within the reaction zone below the maximum temperature desired, appropriate cooling means may be provided inside or outside of the chamber.

The present process is not dependent upon the presence of any added catalyst in the reaction zone, although the use of catalysts is not precluded from the scope of the invention. It frequently is desirable to effect the process in the absence of any added solid catalyst since it has been found that the additional surface presented by a solid material in the reaction zone may under certain circumstances tend to increase undesirably carbonization in the reaction mixture under the conditions of reaction.

After the reaction mixture has exited from the reaction zone, it is highly desirable to provide means for promptly stopping reaction so as to avoid the occurrence of undesired continued reaction or secondary or side reactions. This may be accomplished conveniently, for example, by cooling the reaction mixture as it leaves the reaction zone and promptly thereafter recovering the unsaturated acid halide product. Recovery of the unsaturated acid halide product may be accomplished, for example, by appropriate use of selective solvents, fractional distillations, or by other suitable means apparent to those skilled in the art. Hydrogen chloride in the reaction mixture may be removed by contacting the mixture with water or aqueous alkali. Any excess of the initial unsaturated aldehyde may be recycled through the process.

The following examples will illustrate certain specific embodiments of the present process of effecting preferential formyl halogenation. It will be understood, however, that the examples are given by way of illustration and are in no way intended to be regarded as limiting the scope of the present invention as defined by the appended claims.

*Example I*

Acrolein was volatilized and a stream of the vapor was preheated to about 225° C. A stream of chlorine gas was introduced into the stream of acrolein vapor in a molar ratio of acrolein to chlorine of 1.91:1. The mixed reactants promptly thereafter were passed at a flow rate of 0.32 total mole per minute through a quartz reaction tube having an inside diameter of 2.2 cm. and a length of 51 cm. and heated by an external source of heat to 285° C. The reaction was exothermic and the temperature within the reaction zone rose to about 320° C. Upon leaving the reaction zone the reaction mixture was cooled rapidly and the liquid products were collected. The gaseous product which was primarily hydrogen chloride was absorbed in water. Acrylyl chloride was recovered from the liquid products in good yield by fractional distillation.

*Example II*

Methacrolein was volatilized and preheated in a continuous stream to about 250° C. Gaseous chloride was mixed with the methacrolein in a molar ratio of methacrolein to chlorine of 2.0:1 and the mixture was passed through the quartz reaction tube used in the foregoing experiment, at a flow rate of 0.197 total mole reactants per minute and at a temperature of 400° C. to 470° C. Methacrylyl chloride was recovered in good yield from the cooled products of reaction.

*Example III*

Crotonaldehyde was preheated in the gaseous state and mixed with gaseous bromine in a ratio of 2.2 moles crotonaldehyde per mole of bromine. The mixture was passed through the reaction tube used in Example I at a flow rate of 0.17 total mole reactants per minute and at a temperature of 300° C. to 450° C. Crotonyl bromide was recovered in good yield from the products of reaction.

We claim as our invention:

1. A process which comprises subjecting an alpha,beta-olefinic unsaturated aldehyde in the vapor state to reaction at a temperature between about 200° C. and about 600° C. with a halogen in the gaseous state selected from the group consisting of chlorine and bromine present in an amount corresponding to a molar ratio of unsaturated aldehyde to said halogen between about 5:1 and about 1:1 whereby the hydrogen atom of the formyl group of said unsaturated aldehyde is substituted by an atom of the halogen to produce as product the alpha,beta-olefinic unsaturated acid halide.

2. A process which comprises subjecting an alpha,beta-olefinic unsaturated aldehyde in the vapor state to reaction in the absence of catalysts and at a temperature between about 200° C. and about 600° C. with a halogen in the gaseous state selected from the group consisting of chloride and bromine present in an amount corresponding to a molar ratio of unsaturated aldehyde to said halogen between about 5:1 and about 1:1 whereby the hydrogen atom of the formyl group of said unsaturated aldehyde is substituted by an atom of the halogen to produce as product the alpha,beta-olefinic unsaturated acid halide.

3. A process which comprises commingling in the gaseous state a continuous stream of an alpha,beta-olefinic unsaturated aldehyde and a continuous stream of a halogen selected from the group consisting of chlorine and bromine and promptly thereafter passing a continuous stream of the mixture through a zone at a temperature between about 200° C. and about 600° C. for a time adapted to promote substitution of the hydrogen atom of the formyl group by an atom of the halogen but less than that which will promote excessive undesired side reactions, and recovering a corresponding alpha,beta-olefinic unsaturated acid halide from the effluent from said zone.

4. A process which comprises subjecting an alpha,beta-olefinic unsaturated aldehyde in the vapor state to reaction at a temperature between about 200° C. and about 600° C. with a halogen in the gaseous state selected from the group consisting of chlorine and bromine whereby the hydrogen atom of the formyl group of said unsaturated aldehyde is substituted by an atom of the halogen to produce as product the alpha,beta-olefinic unsaturated acid halide.

5. A process which comprises subjecting acrolein in the vapor state to reaction at a temperature between about 200° C. and about 600° C. with gaseous chlorine present in an amount corresponding to a molar ratio of acrolein to chlorine between about 5:1 and about 1:1 whereby the hydrogen atom of the formyl group of the acrolein is substituted by an atom of chlorine to produce as product acrylyl chloride.

6. A process which comprises subjecting methacrolein in the vapor state to reaction at a temperature between about 200° C. and about 600° C. with gaseous chlorine present in an amount corresponding to a molar ratio of methacrolein to chlorine between about 5:1 and about 1:1 whereby the hydrogen atom of the formyl group of the methacrolein is substituted by an atom of chlorine to produce as product methacrylyl chloride.

7. A process which comprises subjecting crotonaldehyde in the vapor state to reaction at a temperature between about 200° C. and about 600° C. with gaseous chlorine present in an amount corresponding to a molar ratio of crotonaldehyde to chlorine between about 5:1 and about 1:1 whereby the hydrogen atom of the formyl group of the crotonaldehyde is substituted by an atom of chloride to produce as product crotonyl chloride.

ROY W. TESS.
GEORGE W. HEARNE.
HARRY L. YALE.

REFERENCES CITED

The following references are of record in the file of this patent:

UNITED STATES PATENTS

| Number | Name | Date |
| --- | --- | --- |
| 2,130,084 | Groll et al. | Sept. 13, 1938 |
| 2,209,683 | Boese | July 30, 1940 |
| 2,380,500 | Buc et al. | July 31, 1945 |
| 2,411,875 | Gresham et al. | Dec. 3, 1946 |

FOREIGN PATENTS

| Number | Country | Date |
| --- | --- | --- |
| 420,346 | France | 1910 |